(12) United States Patent
Kawakami (10) Patent No.: US 6,407,733 B1
(45) Date of Patent: Jun. 18, 2002

(54) IN-CAR SWITCH CONTROLLER

(75) Inventor: Kazuo Kawakami, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

(21) Appl. No.: 09/539,896

(22) Filed: Mar. 31, 2000

(30) Foreign Application Priority Data

May 31, 1999 (JP) .............................................. 11-150872
May 27, 1999 (JP) .......................................... 11-147522
May 27, 1999 (JP) .......................................... 11-147523

(51) Int. Cl.$^7$ .............................................. G06F 17/00

(52) U.S. Cl. ........................ 345/204; 345/205; 345/700; 345/716; 345/722; 345/764; 345/840; 345/855; 381/86

(58) Field of Search ................................. 345/204, 205, 345/700, 716, 722, 764, 840, 855; 381/86

(56) References Cited

U.S. PATENT DOCUMENTS

| 5,467,277 A | * | 11/1995 | Fujisawa et al. | ................ 701/1 |
| 5,903,264 A | * | 5/1999 | Moeller et al. | ................ 345/13 |
| 6,111,964 A | * | 8/2000 | Ishibashi | .................... 379/454 |
| 6,184,804 B1 | * | 2/2001 | Harrison | ....................... 341/20 |

* cited by examiner

Primary Examiner—Bipin Shalwala
Assistant Examiner—Vincent E. Kovalick
(74) Attorney, Agent, or Firm—McGinn & Gibb, PLLC

(57) ABSTRACT

There is described an in-car switch controller which enables a driver to control electronic devices provided in a car. The controller includes a switch panel which can be placed in the vicinity of a driver's seat such that the driver can readily actuate the switch panel and which comprises a plurality of main switches and sub-switches paired up with the corresponding main switches, the sub-switch being arranged so as to designate and enable the function of the main switch; a display section which can be provided in the front panel or in the vicinity thereof and which displays an image of the main switch paired up with the corresponding sub-switch and an advice image pertaining to the function of the main switch, when the sub-switch is actuated; an image data storage section for storing image data used for producing the images of the main switches and their corresponding advice images; an image generation control section for generating the display image on the basis of the image data stored in the image data storage section; a display drive section for activating the display section so as to display the display screen prepared by the image generation control section; image data designation means for reading image data from the image data storage section in accordance with a specification instruction output from the sub-switch; and a control device which, upon receipt of an operation signal from the main switch enabled by the sub-switch, outputs a control signal for effecting the function assigned to the image of the switch displayed in the display section.

6 Claims, 10 Drawing Sheets

| NUMBER OF MAIN SWITCH | ADDRESS | | | | | |
|---|---|---|---|---|---|---|
| S1 | 1 | IMAGE OF MAIN SWITCH | S1 | S2 | S3 | S4 |
|    |   | ADVICE IMAGE | RADIO / TUNING | VOLUME CONTROL | SOUND QUALITY CONTROL | END |
| S2 | 2 | IMAGE OF MAIN SWITCH | S1 | S2 | S3 | S4 |
|    |   | ADVICE IMAGE | TUNING | RADIO / VOLUME CONTROL | SOUND QUALITY CONTROL | END |
| S3 | 3 | IMAGE OF MAIN SWITCH | S1 | S2 | S3 | S4 |
|    |   | ADVICE IMAGE | TUNING | VOLUME CONTROL | RADIO / SOUND QUALITY CONTROL | END |

| STEP 21 | STEP 22 | SWITCH NUMBER / ADDRESS | INDICATION IMAGE DATA | | | | | | |
|---|---|---|---|---|---|---|---|---|---|
| | | | S21 | S22 | S23 | S24 | S25 | S26 | S27 |
| POWER SWITCH ON | | 1 | CASSETTE PLAYER | RADIO | TV | | | | END |
| | S21 ON | 2 | START ⟩ | STOP □ | FORWARD ≫ | REWIND ≪ | INCREASE VOLUME | DECREASE VOLUME | RETURN TO SCREEN DISPLAY |
| | S22 ON | 3 | FM | AM | | | INCREASE VOLUME | DECREASE VOLUME | RETURN TO SCREEN DISPLAY |
| | S23 ON | 4 | CHANNEL | | | | INCREASE VOLUME | DECREASE VOLUME | RETURN TO SCREEN DISPLAY |

| STEP 31 | STEP 32 | ADDRESS | IMAGE DATA | | | | | |
|---|---|---|---|---|---|---|---|---|
| POWER SWITCH ON | | 1 | IMAGE OF PROTRUDING SWITCH | S31 | S32 | S33 | | S44 |
| | S31 ON | 2 | IMITATED IMAGE | CASSETTE PLAYER | RADIO | TV | | END |
| | | | IMAGE OF PROTRUDING SWITCH | S31 | S33 | S35 | S37 | S39 | S44 |
| | S32 ON | 2 | IMITATED IMAGE | START > | STOP □ | FORWARD ≫ | REWIND ≪ | INCREASE VOLUME | DECREASE VOLUME | RETURN TO SCREEN DISPLAY |
| | | 3 | IMAGE OF PROTRUDING SWITCH | S31 | S33 | | | S39 | S43 | S44 |
| | S33 ON | | IMITATED IMAGE | FM | AM | | | INCREASE VOLUME | DECREASE VOLUME | RETURN TO SCREEN DISPLAY |
| | | 4 | IMAGE OF PROTRUDING SWITCH | S31 | | | | S39 | S43 | S44 |
| | | | IMITATED IMAGE | CHANNEL | | | | INCREASE VOLUME | DECREASE VOLUME | RETURN TO SCREEN DISPLAY |

FIG.13

IN-CAR SWITCH CONTROLLER

BACKGROUND OF THE INVENTION

The present invention relates to an in-car switch controller for controlling an electronic device disposed in a car.

In an in-car switch controller of this type, switches for selecting functions and adjusting the functions are usually provided in a front panel or in the vicinity thereof.

A driver encounters difficulty in adjusting the switches while maintaining a driving posture, and must change his posture in order to adjust a switch. Further, the driver actuates a switch while visually ascertaining the functions of the switches located on the switch controller, thereby deteriorating the driver's concentration on his driving, thus creating a safety hazard.

Further, the present invention relates to an in-car switch controller for controlling an audio system or a like device mounted in a car.

In an in-car switch controller of this type, switches for selecting functions and adjusting the functions are usually provided in a front panel or in the vicinity thereof.

A driver encounters difficulty in adjusting the switches while maintaining a driving posture, and must change his posture in order to adjust a switch. Further, the driver actuates a switch while visually ascertaining the functions of the switches located on the switch controller, thereby deteriorating the driver's concentration on his driving, thus creating a safety hazard.

Still further, the present invention relates to an in-car switch controller for controlling an audio system or a like device mounted in a car.

In an in-car switch controller of this type, switches for selecting functions and adjusting the functions are usually provided in a front panel or in the vicinity thereof. Many switches are provided, including switches which are rarely used under ordinary circumstances.

A driver encounters difficulty in adjusting the switches while maintaining a driving posture, and must change his posture in order to adjust a switch. Further, since numerous switches are provided on the front panel, ascertaining a desired switch results in deterioration of the driver's concentration on his driving, thus creating a safety hazard.

SUMMARY OF THE INVENTION

The present invention has been conceived to solve the drawback of the background art and is aimed at providing an in-car switch controller which does not raise any problem in driving and offers safety and excellent operability.

According to a first aspect of the present invention, there is provided an in-car switch controller which enables a driver to control electronic devices provided in a car, the controller comprising:

a switch panel which can be placed in the vicinity of a driver's seat such that the driver can readily actuate the switch panel and which comprises a plurality of main switches and sub-switches paired up with the corresponding main switches, the sub-switch being arranged so as to designate and enable the function of the main switch;

a display section which can be provided in the front panel or in the vicinity thereof and which displays an image of the main switch paired up with the corresponding sub-switch and an advice image pertaining to the function of the main switch, when the sub-switch is actuated;

an image data storage section for storing image data used for producing the images of the main switches and their corresponding advice images;

an image generation control section for generating the display image on the basis of the image data stored in the image data storage section;

a display drive section for activating the display section so as to display the display screen prepared by the image generation control section;

image data designation means for reading image data from the image data storage section in accordance with a specification instruction output from the sub-switch; and a control device which, upon receipt of an operation signal from the main switch enabled by the sub-switch, outputs a control signal for effecting the function assigned to the image of the switch displayed in the display section.

Preferably, the main switches paired up with their corresponding sub-switches are adjacent to each other or combined together. When the sub-switch is actuated by means of touching or corresponding action, an operation section of the corresponding main switch is moved, thereby activating the main switch.

According to a second aspect of the present invention, there is provided an in-car switch controller which enables a driver to control electronic devices provided in a car, the controller comprising:

a switch array which can be placed in the vicinity of a driver's seat where the driver can readily perform operation and which comprises a plurality of switches;

a camera which can be disposed in the vicinity of the driver's seat and which successively photographs the operating action of the switch array and the switching action of the driver;

an indication image data storage section which stores indication image data used for indicating functions assigned to the respective switches corresponding to the images photographed by the camera, in the areas surrounding the respective switches;

an image synthesis section for merging the image data pertaining to the photographed image and the indication image data stored in the indication image data storage section into a single image;

a display section which can be placed on the front panel or in the vicinity thereof and displays the synthesized image; and a control section which receives an operation signal output from the switch and outputs a control signal for effecting the function assigned to the image of the switch displayed in the display section.

Preferably, the image data storage section stores a plurality of sets of indication image data corresponding to an image of the switch array, and the switch has the function of designating a set of indication image data for each type of device to be controlled, so as to correspond to the indication of the switch's image. Further, the control section has indication image data designation means which receives an operation signal from the switch, to thereby instruct the indication image data storage section to read image data in order to update the set of indication image data to the specific indication image set.

According to a third aspect of the present invention, there is provided an in-car switch controller which enables a driver to control electronic devices provided in a car, the controller comprising:

a switch panel which can be placed in the vicinity of a driver's seat such that the driver can readily actuate the switch panel and which comprises a plurality of switches, an operation section of each of the switches being arranged so as to be selectively switched between a protruding state in which the operation section renders an operation effective and a depressed state in which the operation section renders an operation disabled;

a display section which can be provided in the front panel or in the vicinity thereof and displays images of the switches remaining in a protruding state and indication images for indicating the functions of the switches;

an image data storage section for storing image data used for producing the images of the switches and the indication images;

a display drive section for controlling the display section on the basis of the image data stored in the image data storage section;

a switch-status control section which performs a control operation for bringing the switches into a protruding state or a depressed state, on the basis of the image data stored in the image data storage section;

a switch layout control section which reads image data from the image data storage section in accordance with preset switch-status designation conditions or switch-status designation conditions which are set appropriately, to thereby impart the image data to the display drive section and the switch-status control section; and a control device which receives an operation signal from a switch and outputs a control signal for effecting the function assigned to the image of the switch displayed in the display section.

Preferably, the image data storage section stores a plurality of sets of image data consisting of images of the switches remaining in a protruding state and indication images for indicating the functions of the switches, and the switch has the function of designating a set of indication image data for each type of a device to be controlled, so as to correspond to the indication of the switch's image. Further, preferably the control device has switch layout designation means which receives an operation signal from the switch, to thereby specify an image data set, and instructs the image data storage section to read image data in order to update the specified image data set.

DETAILED DESCRIPTION OF THE PREFERRED EMBODIMENTS (Embodiment 1)

Figure 1:
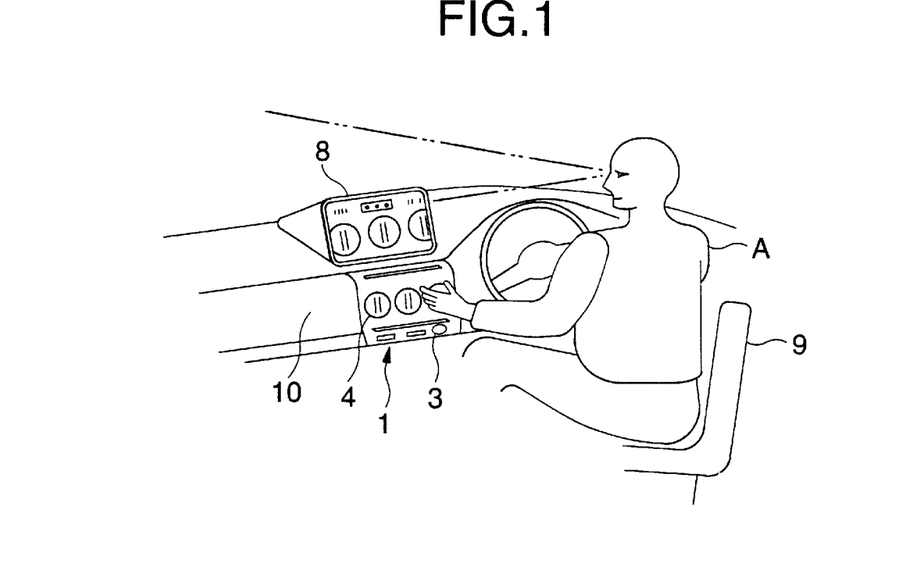
FIG. 1 is a perspective view showing a state in which an in-car switch controller of the present invention is provided in a car.

A first embodiment of the present invention will be described hereinbelow by reference to the accompanying drawings. FIG. 1 is a perspective view showing an example state in which the in-car switch controller of the present invention is provided in a car. In the drawing, reference numeral 1 designates a switch panel which is disposed on a front panel 2 so that a driver A can actuate switches provided on the switch panel 1. The switch panel 1 comprises a power switch 3 for turning on or off power to the in-car switch controller, which will be described later and a plurality of function selection switches 4.

Figure 2:
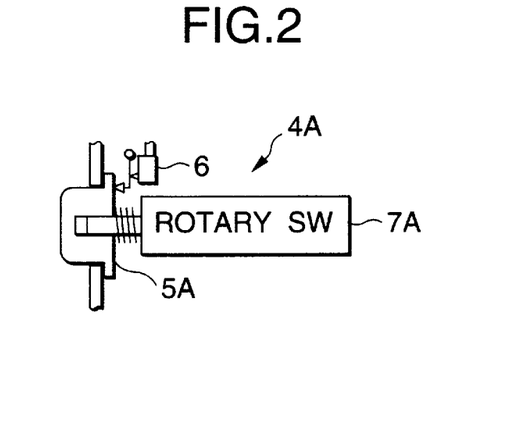
FIG. 2 is a cross-sectional view schematically showing an example structure of a function control switch.

FIG. 2 is a cross-sectional view briefly showing an example structure of the function control switch 4. In the drawing, a function control switch 4A comprises a main switch 5A to be rotated and a sub-switch 6A which is adjacent to the main switch 5A so as to pair up with the main switch 5A and effectively designates the function of the main switch 5A. The sub-switch 6A has a touch-sensor function of detecting light pressure stemming from the operation performed by the driver A and enables the function of the main switch 5A. Reference numeral 7A designates a rotary operation section and performs the thus-enabled function upon being rotated.

Figure 3:
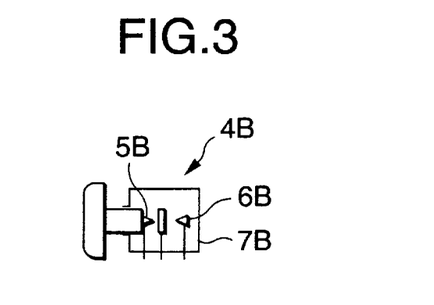
FIG. 3 is a cross-sectional view schematically showing another example structure of a function control switch.

FIG. 3 is a schematic representation briefly, showing another example of structure of the function control switch 4. In the drawing, a function control switch 4B comprises a push-button-type main switch (a contact point of the switch is designated by 5B), and a sub-switch 6B which is integrally combined with the main switch 5B and specifies and enables the function of the main switch 5B (a contact point of the sub-switch is designated by 6B). Reference numeral 7B designates a push button which enables the function of the main switch SB upon detection light pressure stemming from the operation performed by the driver A and which performs the function when being pressed.

Reference numeral 8 in FIG. 1 designates a display section which has a liquid crystal panel and is disposed on top of the front panel 2. The display section 9 is located substantially within the view field of the driver A designated by chain lines and can be viewed by the driver A while the driver A remains in his ordinary driving position. When the sub-switch 6 (corresponding to the sub-switches 6A and 6B) of the function control switch 4 is actuated, the display section 8 indicates enlarged images of the respective function control switches 4 including the function control switch 4 paired up with the sub-switch 6 and an advice image pertaining the respective switch 4, at the appropriate time.

A control section for controlling the in-car switch controller is provided behind (i.e., inside) the switch panel 1.

Figure 4:
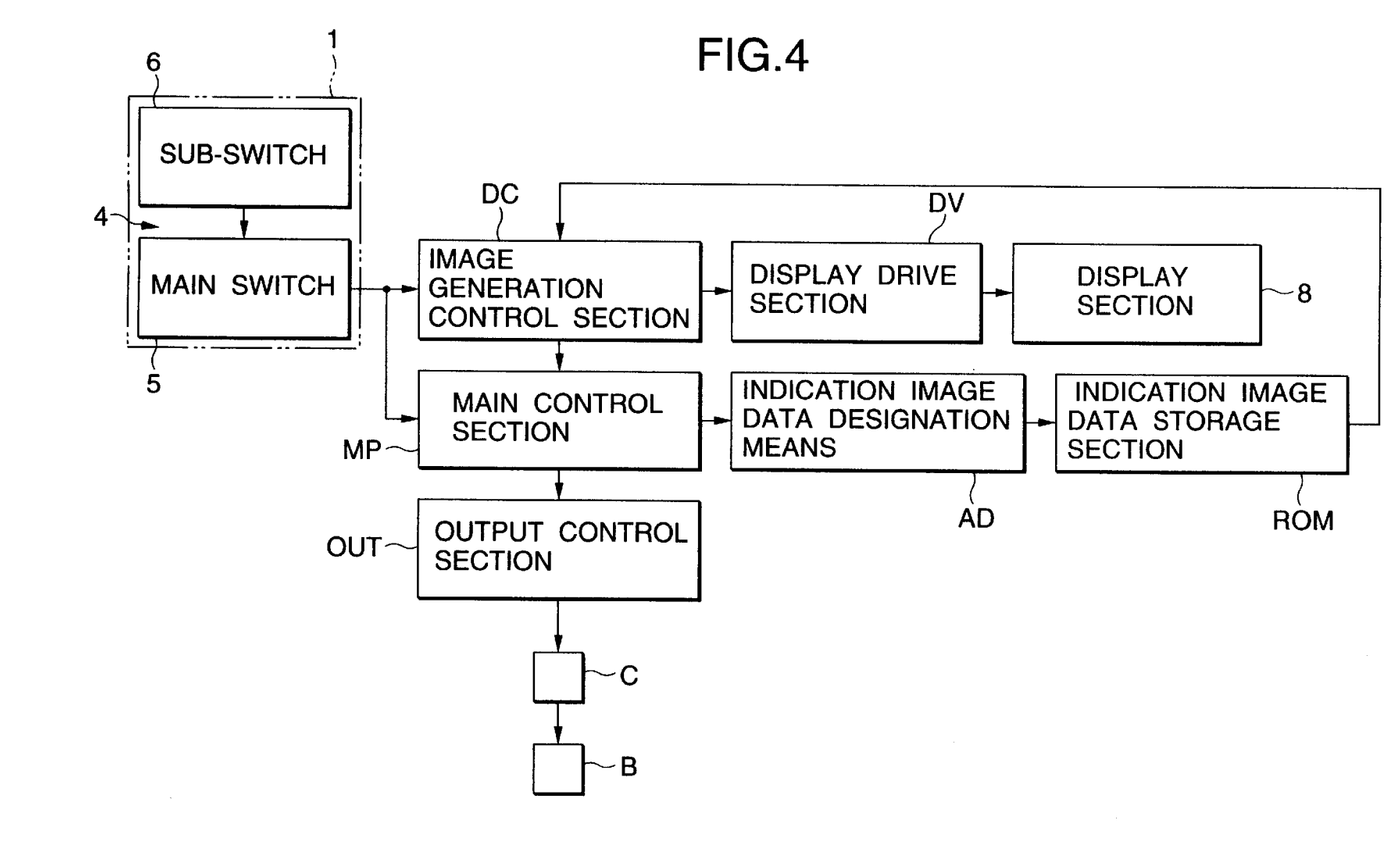
FIG. 4 is a block diagram showing an example configuration of the in-car switch controller of the present invention.

FIG. 4 is a block diagram showing an example configuration of the in-car switch controller of the present invention. When the power switch 3 shown in FIG. 1 is pressed, the in-car switch controller starts operation. In the drawing, MP designates a main control section of the in-car switch controller which consists primarily of a microprocessor and which, upon receipt of an operation signal output from the switch 4, controls individual sections shown in FIG. 1 according to a program.

Figure 5:
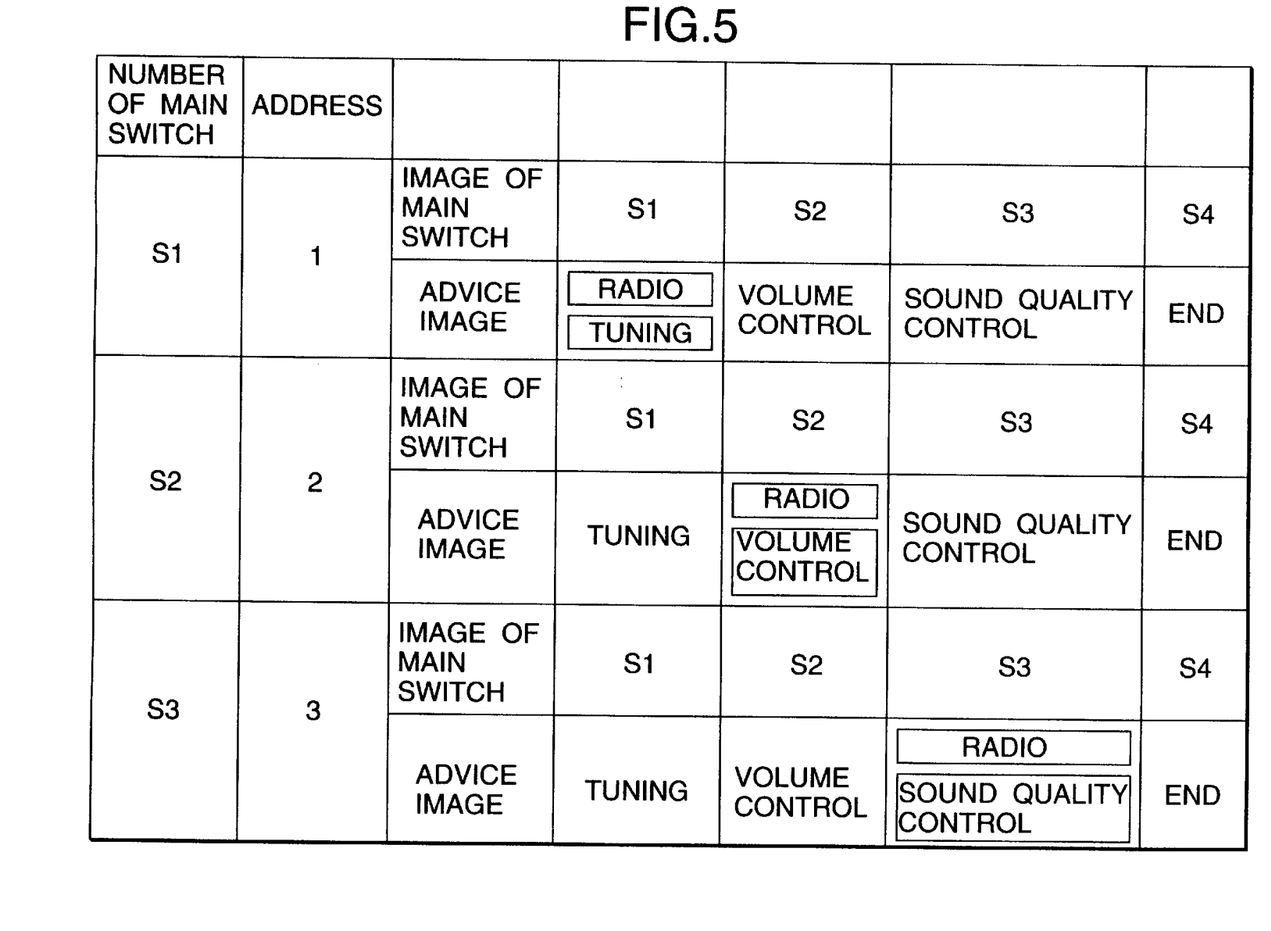
FIG. 5 is a schematic representation showing the contents of data stored in an image data storage section ROM.

ROM corresponds to an image data storage section and stores image data to be used for producing an image for displaying the images of the main switches 5 (5A or 5B) and corresponding advice images. FIG. 5 shows the contents of the data stored in the image data storage section ROM. In FIG. 5, the power switch 3 is located on a lower row of the switch panel 1, and the function selection switch 4 located at the left end position on the top row is assigned switch number Si. Switch numbers are sequentially assigned to the other function selection switches 4 on the same row in a rightward direction. In other, lower rows, switch numbers are assigned to the function selection switches 4 in an incrementing manner; specifically, switch numbers 4 are assigned S1, S2, S3, and S4. Although not shown in FIG. 1, the switch 4 assigned switch number S4 is a usually push-button switch and deactivates the operation of a device to be controlled, as will be described later.

As shown in the drawing, the image data storage section ROM stores, as image data which are assigned an address (address 1) when the driver's hand touches the sub-switch 6 of the switch 4 assigned switch number S1, image data indicating the function control switches 4 assigned switch numbers S1, S2, S3, and S4 and the layout of the function selection switches 4, image data such as "RADIO," "TUNING," or a like image, allocated as an advice image to the switch number S1, image data "VOLUME CONTROL" or a like image allocated as an advice image to the switch number S2, image data "VOLUME CONTROL" or a like image allocated as an advice image to the switch number S3, and image data "END" allocated as an advice image to the switch number S4. In this case, frame display instruction data for instructing enclosing the advice image with a frame are stored so as to be paired up with the image data, in order to discernibly indicate that the switch 4 assigned switch number S1 is enabled.

The image data storage section ROM stores, as image data which are assigned an address (address 2) when the driver's hand touches the sub-switch 6 of the switch 4 assigned switch number S2, image data indicating the function control switches 4 assigned switch numbers S1, S2, S3, and S4 and the layout of the function selection switches 4, image data, such as "TUNING," or a like image, allocated as an advice image to the switch number S1, image data "RADIO" or a like image allocated as an advice image to the switch number S2, image data "VOLUME CONTROL" or a like image allocated as an advice image to the switch number S3, and image data "END" allocated as an advice image to the switch number S4. In this case, frame display instruction data for instructing enclosing the advice image with a frame are stored so as to be paired up with the image data, in order to discernibly indicate that the switch 4 assigned switch number S2 is enabled.

The image data storage section ROM stores, as image data which are assigned an address (address 3) when the driver's hand touches the sub-switch 6 of the switch 4 assigned switch number S3, image data conforming with the above-described image data. More specifically, in this case, the image data storage section ROM stores, as an advice image assigned to the switch number S3, image data, such as "RADIO," "VOLUME CONTROL," or a like image, as well as frame display instruction data indicating that the function assigned to the switch number S3 is enabled, so as to be paired up with the image data. Although not shown in the drawing, the image data storage section ROM stores image data, such as [FM] or [AM], so as to correspond to the operation of the main switch 5 of an enabled switch number, for example the switch number S1 designated by address 1, such that the image data can be sequentially read.

AD designates image data designation means for addressing the image data storage section ROM and is controlled by the main control section MP. Upon receipt of an operation signal output from the switch 4, the image data storage section ROM is assigned the address shown in FIG. 5 on the basis of the conditions under which there are actuated the switch numbers S1 through S3 designated in connection with the image data storage section ROM, thereby reading image data. DC in FIG. 4 designates an image generation control section and performs a control operation for causing the display section 8 to indicate an image on the basis of the data stored in the image data storage section ROM. DV in FIG. 4 designates a display drive section and activates the display section 8 so as to display the image controlled by the image generation control section DC.

B in FIG. 4 designates a radio disposed in the car, and C designates an electronic switch section for turning on/off connection to one terminal of a function control switch (not shown) provided for the radio B. OUT in FIG. 4 designates an output control section for controlling the electronic switch C and is controlled by the main control section MP according to a program. Upon receipt of a signal from the switch 4, the main control section MP controls the switch layout designation means AD and simultaneously controls the output section OUT according to a program so as to effect connection of the switch corresponding to the image data output from the image generation control section DC. The main control section MP, the switch layout designation means AD, and the output control section OUT constitute a control device of the present invention.

By means of such a configuration, the power switch 3, for example, is turned on in the first step, and the switch 4 assigned, for example, switch number S1 is actuated, to thereby turn on the sub-switch 6. At this time, images of the switches 4 assigned switch number S1, S2, S3, and S4 and character images. "RADIO" and "TUNING" enclosed with a frame appear in the vicinity of the switch 4 assigned switch number S1; character data "VOLUME CONTROL" appears in the vicinity of the switch 4 assigned switch number S2; character data "VOLUME CONTROL" appears in the vicinity of the switch 4 assigned switch number S3; and a character image "END" appears in the vicinity of the switch 4 assigned switch number S4. Each time actuation of the sub-switch 6 of the switch 4 assigned switch number S1 is repeated, image [FM] is alternately switched to [AM], and vice versa, and is indicated on the display section 8. Tuning operation is performed by actuation of the main switch 5 subsequent to the display of the image. When the switch 4 assigned switch number S4 is actuated, the device is deactivated.

In the present embodiment, the image data storage section ROM and the main control section MP are associated with devices to be controlled and their specified functions. There may also be prepared image data and programs associated with many types of devices and their functions, and the in-car switch controller may be arranged so as to be able to select appropriate ones from the image data and programs, in order to provide versatility to the in-car switch controller. Further, although the images of all the switches 4 provided on the switch panel 1 are displayed, only the image of the selected switch 4 and images of other adjacent switches may be displayed.

As has been described above, the driver can operate any one of the switches 4 while viewing the display 9 and maintaining his driving posture. The driver can actuate a switch while ascertaining the switch by means of his sense of touch. Therefore, the present invention provides an in-car switch controller which does not impose any problem in driving a car and offers safety and excellent operability.

The present invention provides an in-car switch controller which enables a driver to control electronic devices provided in a car, the controller comprising:

a switch panel which can be placed in the vicinity of a driver's seat such that the driver can readily actuate the switch panel and which comprises a plurality of main switches and sub-switches paired up with the corresponding main switches, the sub-switch being arranged so as to designate and enable the function of the main switch;

a display section which can be provided in the front panel or in the vicinity thereof and which displays an image of the main switch paired up with the corresponding sub-switch and an advice image pertaining to the function of the main switch, when the sub-switch is actuated;

an image data storage section for storing image data used for producing the images of the main switches and their corresponding advice images;

an image generation control section for generating the display image on the basis of the image data stored in the image data storage section;

a display drive section for activating the display section so as to display the display screen prepared by the image generation control section; and image data designation means for reading image data from the image data storage section in accordance with a specification instruction output from the sub-switch. Upon receipt of an operation signal from the main switch enabled by the sub-switch, a control device outputs a control signal for effecting the function assigned to the image of the switch displayed in the display section. By means of such a configuration, the driver can operate any one of the switches while viewing the display and maintaining his driving posture. The driver can actuate a switch while ascertaining his hand for operation as if he were actually viewing a real switch. Therefore, the present invention provides an in-car switch controller which does not impose any problem in driving a car and offers safety and excellent operability.

(Embodiment 2)

Figure 6:
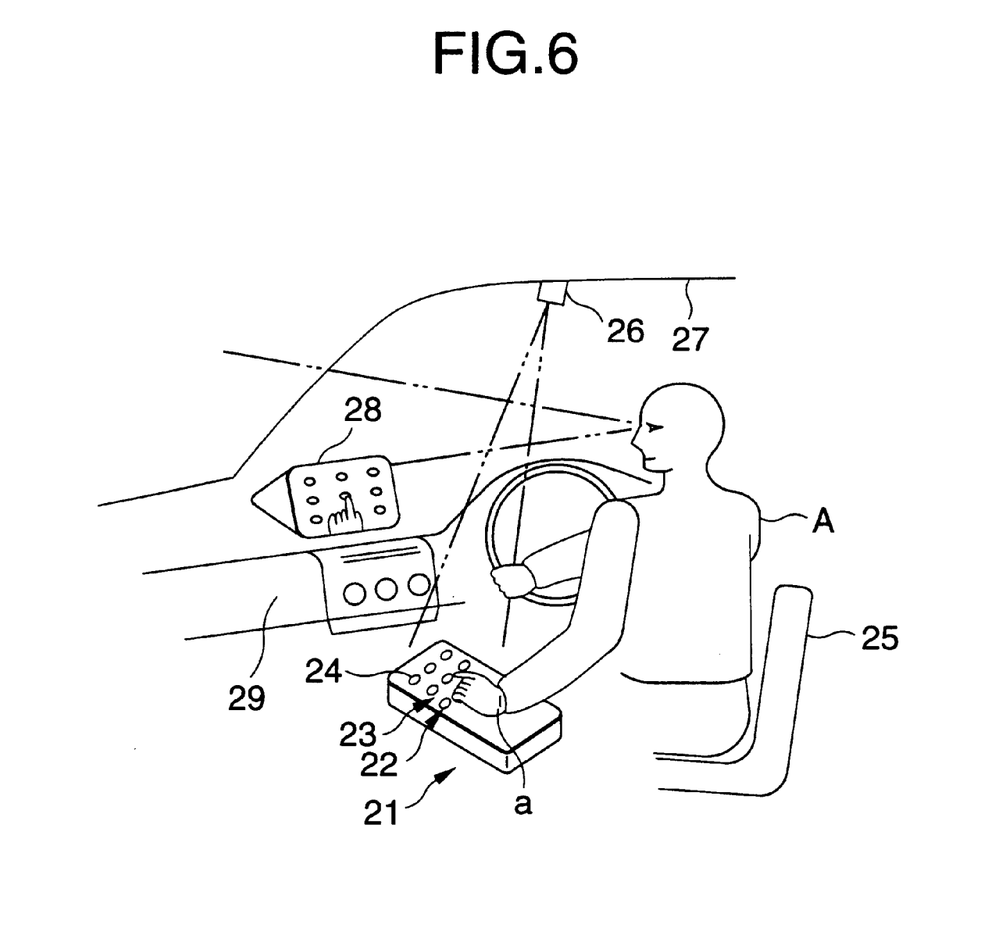
FIG. 6 is a perspective view showing a state in which an in-car switch controller of the present invention is provided in a car.

A second embodiment of the present invention will be described hereinbelow by reference to the accompanying drawings. FIG. 6 is a perspective view showing an example state in which the in-car switch controller of the present invention is provided in a car. In the drawing, reference numeral 21 designates a switch panel. The switch panel 21 comprises a power switch 22 for turning on or off power to the in-car switch controller, which will be described later and a switch array 23. A plurality of function selection switches 24 are arranged on the switch array 23. The switch panel 21 is disposed at the side of a seat 25 of a driver A so that the driver A can actuate the switches. Specific functions are allocated to the respective switches 24, and the driver A selects or controls the function of unillustrated audio equipment by designation of the functions allocated to the respective switches 24.

Reference numeral 26 designates a CCD camera mounted at an angle on a ceiling 27 of the vehicle body at a position close to the front end of the driver's seat 25. The CCD camera 26 has a predetermined field of view, as designated by chain lines shown in FIG. 6, and successively photographs the switch array 23 and the driver's action including the movement of the driver's hand "a" performed for activating a switch 24. Reference numeral 28 designates a display section equipped with a liquid crystal panel. The display section 28 is mounted on the top of the front panel 29 and is located within the driver A's view field as designated by chain lines. The driver A can view the display section 28 while maintaining an ordinary driving posture. An image captured by the CCD camera 26 is sequentially displayed on the display section 28. If the view field of the CCD camera 26 is dark, as would be the case at night, the area surrounding the view field is illuminated. Alternatively, infrared rays emitted from the CCD camera 26 are radiated onto the field of view, thereby enabling infrared-ray photography.

Figure 7:
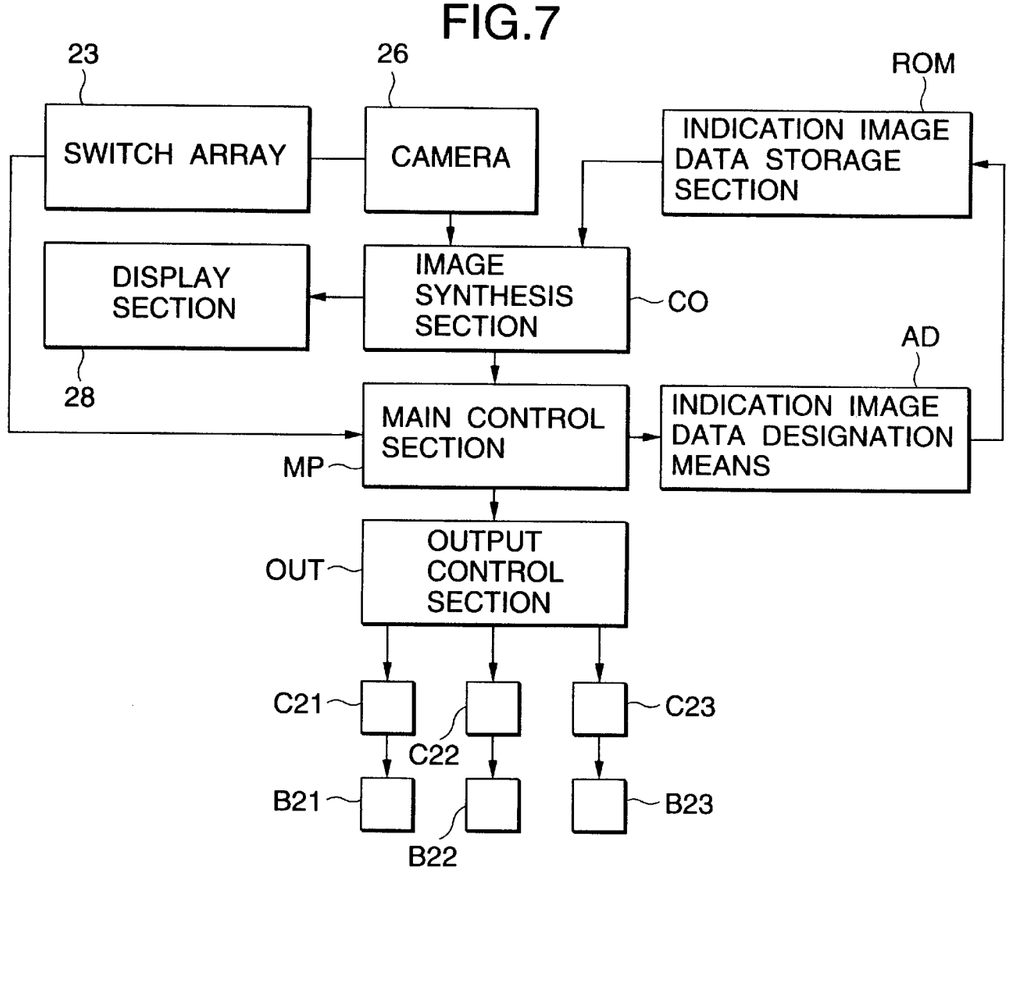
FIG. 7 is a block diagram showing an example configuration of the in-car switch controller of the present invention.

A control section for controlling the in-car switch controller is provided behind (i.e., inside) the switch panel 21. FIG. 7 is a block diagram showing an example configuration of the in-car switch controller of the present invention. When the power switch 22 shown in FIG. 6 is pressed, the in-car switch controller starts operation. In the drawing, MP designates a main control section of the in-car switch controller which consists primarily of a microprocessor and which, upon receipt of an operation signal output from the switch 24 of the switch array 23, controls individual sections shown in FIG. 7 according to a program.

Figure 8:
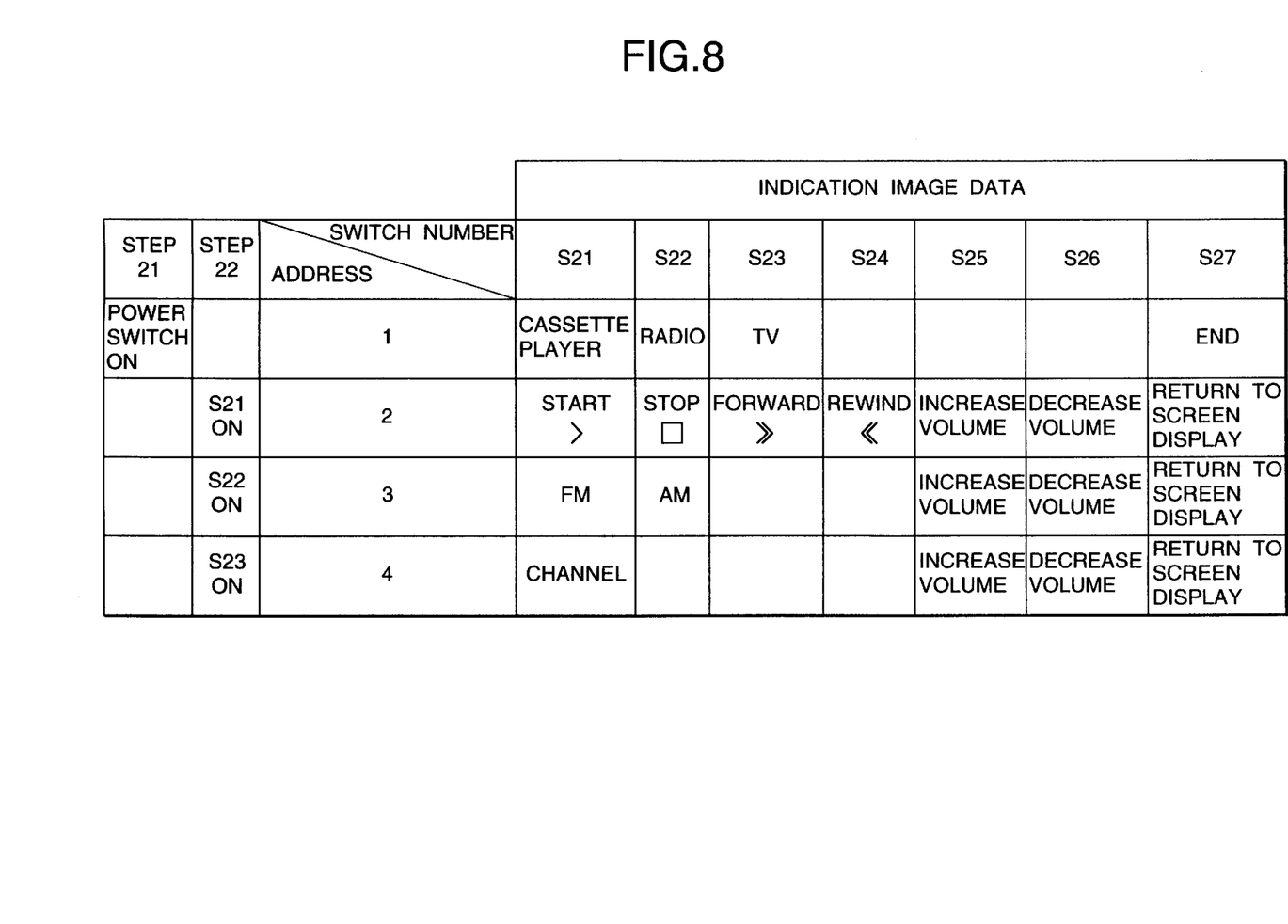
FIG. 8 is a schematic representation showing the contents of the data stored in an indication image data storage section.

ROM stores indication image data for indicating functions assigned to the respective switches corresponding to the image photographed by the CCD camera 26, to the areas surrounding the respective switches. FIG. 8 shows the contents of the data stored in the image data storage section ROM. As shown in the drawing, the image data storage section ROM stores, as image data which are assigned an address (address 21) as a result of actuation of the power switch 22 (a first step), character data "CASSETTE PLAYER" allocated to the switch number S21, character data "RADIO" allocated to the switch number S22, character data "TV" allocated to the switch number S23, and character data "END" allocated to the switch number S27.

Further, the image data storage section ROM stores, as image data which are assigned an address (address 22) as a result of successive actuation of the power switch 22 and, for example, the switch number S21 (a second step), character data "START" allocated to the switch number S21, indication mark image data allocated to the switch number S21, character data "STOP" allocated to the switch number S22, similar character data allocated to the respective switches S23 to S26, and character data "RETURN TO SCREEN DISPLAY" allocated to the switch number S27. Likewise, the image data storage section ROM stores character data allocated to address 23 in step 22 and character data allocated to address 24 in step 22.

AD in FIG. 7 designates indication image data designation means for addressing the image data storage section ROM and is controlled by the main control section MP. As shown in FIG. 8, upon receipt of an operation signal output from the switch 24, the image data storage section ROM is assigned an address on the basis of the conditions under which the power switch 22 and the switch numbers S21 through S27 are actuated, as has been described above, thereby updating the indication image data sets to a specific indication data image set.

CO in FIG. 7 designates an image synthesis section, where image data pertaining to the switch array 23 photographed by the CCD camera 26 and indication image data stored in the indication image data storage section ROM are merged into a single set of image data. In the present embodiment, while the power switch 22 is in an ON state, the image synthesis section CO continuously receives, as the image data photographed by the CCD camera 26. Further, the image synthesis section CO receives the indication image data each time the indication image data storage section ROM reads new image data. At this point in time, the image synthesis section CO updates synthesized image data and delivers the thus-updated synthesized image data to the display section 28. Further, information about updating of each set of synthesized data is delivered to the main control section MP. At the time of setting of the CCD camera 26, the orientation of the camera is adjusted such that a photographed image is located appropriately in relation to the indication image.

B21, B22, and B23 in FIG. 7 designate electronic equipment disposed in the car; that is, a cassette player, a radio, and a TV set. C21, C22, and C23 designate electronic switch sections; C21 turns on/off connection to one terminal of a function switch of the electronic equipment B21, C22 turns on/off connection to one terminal of a function switch of the electronic equipment B22, and C23 turns on/off connection to one terminal of a function switch of the electronic equipment B23. OUT designates an output control section for controlling the electronic switches C21, C22 and C23 and is controlled by the main control section MP according to a program. Upon receipt of a signal from the switch 24 or a signal output from the image synthesis section CO, the main control section MP controls the switch layout designation means AD and simultaneously controls the output section OUT according to a program so as to effect connection of the switch corresponding to the switch layout information output from the switch layout control section ARC. The main control section MP, the switch layout designation means AD, and the output control section OUT constitute a control device of the present invention.

By means of such a configuration, when the power switch 22, for example, is turned on in the first step, in the display section 28, a character image "CASSETTE PLAYER" appears in the vicinity of the switch number S21; a character image "RADIO" appears in the vicinity of the switch number S22; a character image "TV" appears in the vicinity of the switch number S23; and a character image "END" appears in the vicinity of the switch number S27. When any one of the switches 24 assigned the switch numbers S21, S22, S23, and S27 is pressed, the function assigned to the thus-pressed switch 24 is performed. In this case, in a case where the switch 24 assigned switch number S27 is pressed, the in-car switch controller is brought into an END state; i.e., a power-off state.

In a case where in the second step the switch 24 assigned switch number S21, for example, is pressed, function "CASSETTE PLAYER" is enabled. If the switch 24 assigned switch number S21 is pressed playback operation is started. If the switch 24 assigned switch number S is pressed, the playback operation is interrupted. Further, if the switch 24 assigned switch number S25 is pressed during the playback operation, a sound level gradually increases during the period of time in which the actuation of the switch 24 is continued. If the switch 24 assigned switch number S27 is actuated, the in-car switch controller is brought into a "RETURN TO SCREEN DISPLAY" mode, in which the switches 24 corresponding to address 21 and their corresponding images are displayed, thus enabling selection of a device.

In the present embodiment, the image data storage section ROM and the main control section MP are associated with devices to be controlled and their specified functions. There may also be prepared image data and programs associated with many types of devices and their functions, and the in-car switch controller may be arranged so as to enable the driver to select appropriate ones from the image data and programs, in order to provide versatility to the in-car switch controller.

As has been described above, the driver can operate any one of the switches 24 on the switch array 23 while viewing the display 28 and maintaining his driving posture. The driver can actuate a switch 24 while ascertaining his hand for operation as if he were actually viewing a real switch array 23. Therefore, the present invention provides an in-car switch controller which does not impose any problem in driving a car and offers safety and excellent operability.

The present invention provides an in-car switch controller which enables a driver to control electronic devices provided in a car, the controller comprising:

a switch array which can be placed in the vicinity of a driver's seat where the driver can readily perform operation and which comprises a plurality of switches;

a camera which can be disposed in the vicinity of the driver's seat and which successively photographs the operating action of the switch array and the switching action of the driver;

an indication image data storage section which stores indication image data used for indicating functions assigned to the respective switches corresponding to the images photographed by the camera, in the areas surrounding the respective switches;

an image synthesis section for merging the image data pertaining to the photographed image and the indication image data stored in the indication image data storage section into a single image;

a display section which can be placed on the front panel or in the vicinity thereof and displays the synthesized image; and a control section which receives an operation signal output from the switch and outputs a control signal for effecting the function assigned to the image of the switch displayed in the display section. By means of the in-car switch controller, the driver can actuate a switch while ascertaining his hand for operation as if he were actually viewing a real switch array. Therefore, the present invention provides an in-car switch controller which does not impose any problem in driving a car and offers safety and excellent operability.

The present embodiment enables realization of the function of updating a set of indication image data to a specific indication image set when an operation signal is received from the switch. Thus, the present invention provides the function and yields the same advantageous result as that mentioned previously.

(Embodiment 3)

Figure 9:
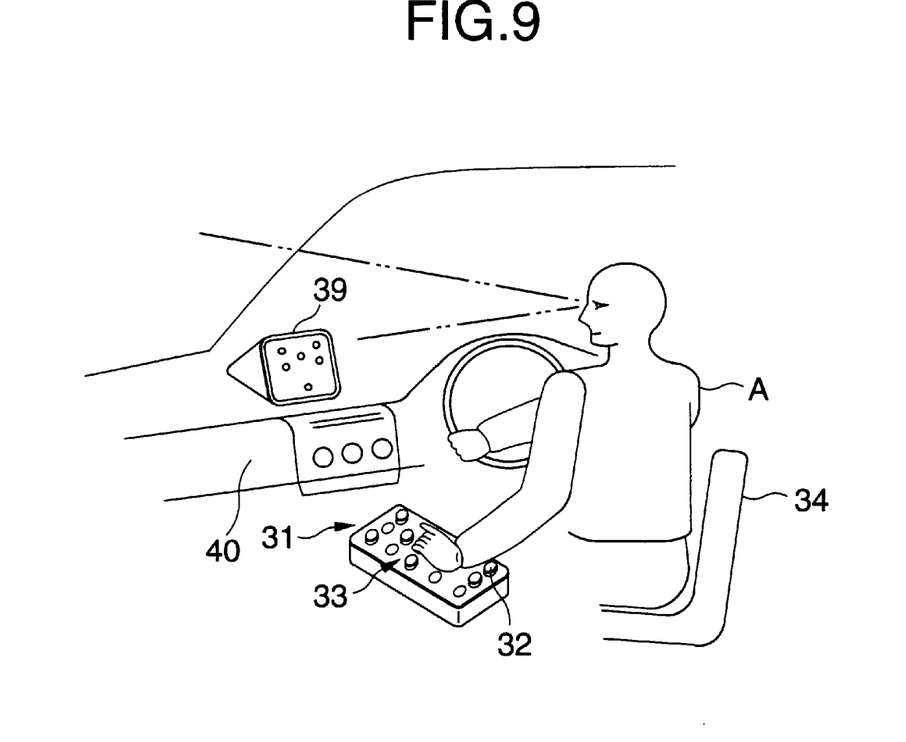
FIG. 9 is a perspective view showing a state in which an in-car switch controller of the present invention is provided in a car.

A third embodiment of the present invention will be described by reference to the accompanying drawings. FIG. 9 is a perspective view showing an example in-car switch controller of the present invention. In the drawing, reference numeral 31 designates a switch panel. A power switch 32 for turning on or off power to the in-car switch controller, which will be described later, and a plurality of function selection switches 33 are arranged in a matrix pattern on the surface of the switch panel 31. The switch panel 31 is disposed at the side of a seat 34 of a driver A so that the driver A can actuate the switches. Specific functions are allocated to the respective switches 33, and the driver A selects or adjusts the function of unillustrated audio equipment by designation of the functions allocated to the switches 33.

Figure 10A:
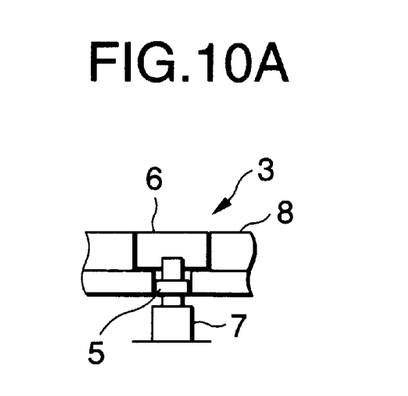
FIGS. 10A and 10B are cross-sectional views showing the configuration of a function selection switch.
Figure 10B:
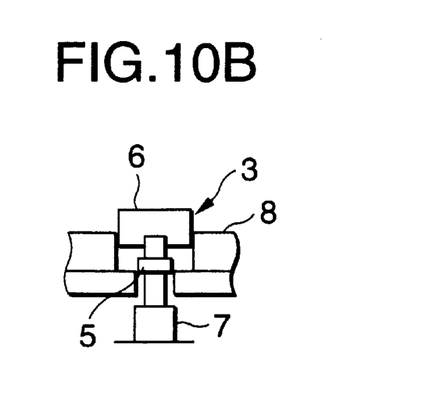

In each of the switches 33, a section to be pressed (hereinafter referred to as a "press section") is selectively brought into either a protruding state in which pressing action is enabled or a depressed state in which pressing action is disabled, by means of a switch layout designation section ARC to be described later. FIGS. 10A and 10B are cross-sectional views showing the structure of the function selection switch 33. FIG. 10A shows the selection switch 33 in a depressed state, and FIG. 10B shows the selection switch in a protruding state. In the drawings, reference numeral 35 designates a switch mechanism; 36 designates the press section; and 37 designates an electromagnetic actuator. The electromagnetic actuator 37 usually maintains the function selection switch 33 in a depressed state such that the top of the press section 36 becomes flush with an upper surface 38 of the switch panel 31. When the in-car switch controller is energized, the press section 36 protrudes from the upper surface 38. The power switch 32 of the in-car switch controller maintains a protruding state at all times, as shown in FIG. 10B.

Reference numeral 39 in FIG. 9 designates a display section which has a liquid crystal panel and is disposed on top of a front panel 40. The display section 39 is located substantially within the view field of the driver A designated by chain lines and can be viewed by the driver A while the driver A remains in his ordinary driving position. Images of the switches 33 maintaining in a protruding state and an indication image for indicating the functions allocated to the switches 33 are indicated on the display section 39 at the appropriate time.

Figure 11:
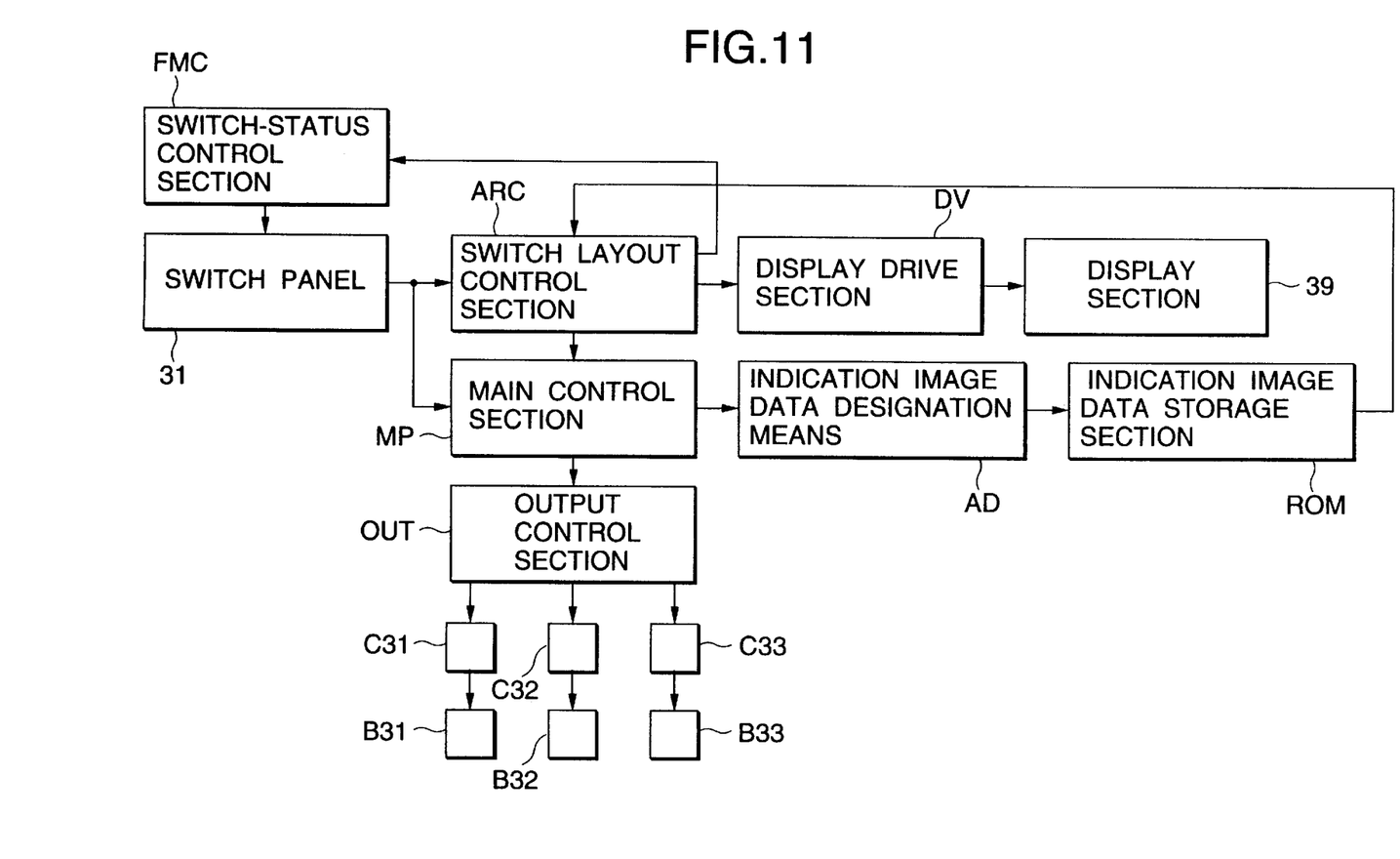
FIG. 11 is a block diagram showing an example configuration of the in-car switch controller of the present invention.

A control section for controlling the in-car switch controller is provided behind (i.e., inside) the switch panel 31. FIG. 11 is a block diagram showing an example configuration of the in-car switch controller of the present invention. When the power switch 32 shown in FIG. 9 is pressed, the in-car switch controller starts operation. In the drawing, MP designates a main control section of the in-car switch controller which consists primarily of a microprocessor and which, upon receipt of an operation signal output from the switch 33, controls individual sections shown in FIG. 11 according to a program.

Figure 12:
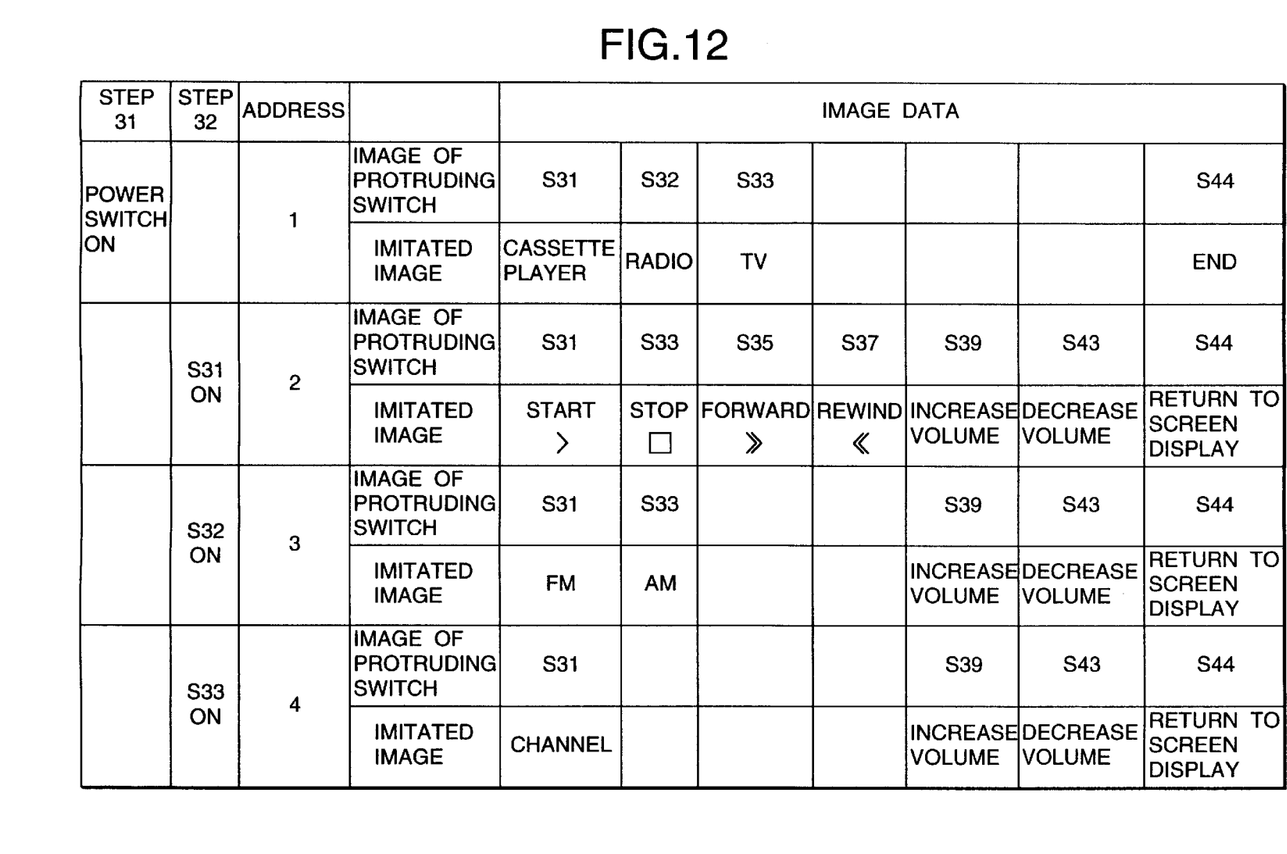
FIG. 12 is a schematic representation showing contents of the image data stored in an image data storage section.
Figure 13:
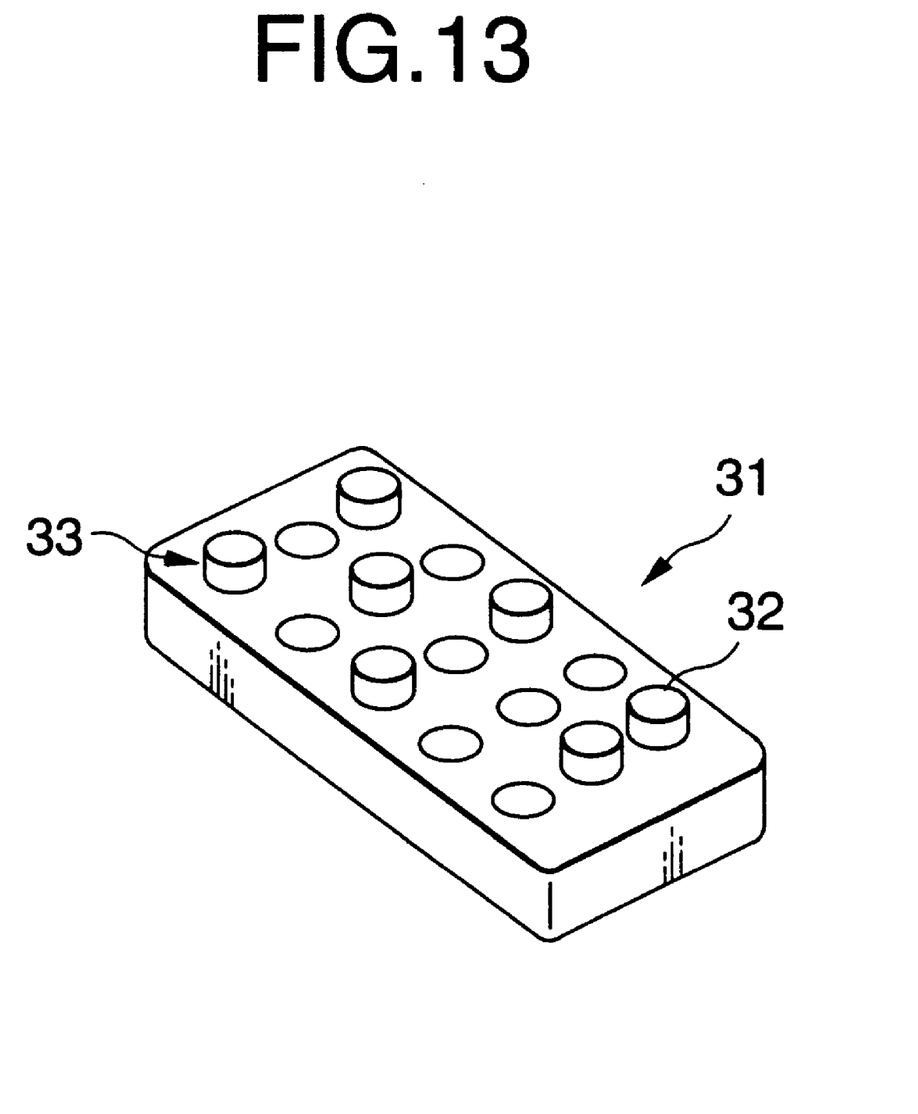
FIG. 13 is a perspective view showing an example switch panel.

ROM corresponds to an image data storage section and stores image data to be used for producing a plurality of sets of images comprising an image of the protruded switches 33 and a indication image for indicating the functions of the switches 33. FIG. 12 shows the contents of the data stored in the image data storage section ROM. In FIG. 13, the power switch 32 is located at the right end on the bottom row of the switch panel 31, and the function selection switch 33 located at the left end position on the top row is assigned switch number S31. Switch numbers are sequentially assigned to the other function selection switches 33 on the same row in a rightward direction. In other, lower rows, switch numbers are assigned to the function selection switches 33 in an incrementing manner. In this way, switch numbers S31 through S44 are assigned to the function selection switches 33.

As shown in the drawing, the image data storage section ROM stores, as image data which are assigned an address (address 31) as a result of actuation of the power switch 32 (a first step), switch image data indicating that the switch numbers S31, S32, S34, and S44 are in a protruding state, character data "CASSETTE PLAYER" allocated to the switch number S31, character data "RADIO" allocated to the switch number S32, character data "TV" allocated to the switch number S33, and character data "END" allocated to the switch number S44.

Further, the image data storage section ROM stores, as image data which are assigned an address (address 32) as a result of successive actuation of the power switch 32 and, for example, the switch number S31 (a second step), switch image data representing that the switches S31, S33, S35, S37, S39, S43, and S44 are in a protruding state, character data "START" allocated to the switch number S31, indication mark image data allocated to the switch number S31, character data "STOP" allocated to the switch number S33, similar character data allocated to the respective switches S35, S37, S39, and S43, and character data "RETURN TO SCREEN DISPLAY." Likewise, the image data storage section ROM stores character data allocated to address 33 in step 32 and character data allocated to address 34 in step 32.

AD in FIG. 11 designates switch layout designation means for addressing the image data storage section ROM and is controlled by the main control section MP. As shown in FIG. 12, upon receipt of an operation signal output from the switch 33, the image data storage section ROM is assigned an address on the basis of the conditions under which the power switch 32 and the switch numbers S31 through S37 are actuated, as has been described above, thereby updating the indication image data sets to a specific indication data image set.

ARC in FIG. 11 designates a switch layout control section which updates the data stored in the image data storage section ROM. On the basis of the data stored in the image data storage section ROM, the ARC designates the switch number of the switch 33 which has protruded from the switch panel 31 and causes the display section 39 to display the image corresponding to the thus-designated switch number. FMC designates a switch-status control section for activating each of the switches 33 so as to cause them to protrude. On the basis of the designating instruction output from the switch layout control section ARC, the FMC operates. DV designates a display drive section and activates the display section 39 on the basis of the designation instruction output from the switch layout control section ARC.

B31, B32, and B33 in FIG. 11 designate electronic equipment disposed in the car; that is, a cassette player, a radio, and a TV set. C31, C32, and C33 designate electronic switch sections; C31 turns on/off connection to one terminal of a function switch of the electronic equipment B31, C32 turns on/off connection to one terminal of a function switch of the electronic equipment B32, and C33 turns on/off connection to one terminal of a function switch of the electronic equipment B33. OUT designates an output control section for controlling the electronic switches C31, C32 and C33 and is controlled by the main control section MP according to a program. Upon receipt of a signal from the switch 33, the main control section MP controls the switch layout designation means AD and simultaneously controls the output section OUT according to a program so as to effect connection of the switch corresponding to the switch layout information output from the switch layout control section ARC. The main control section MP, the switch layout designation means AD, and the output control section OUT constitute a control device of the present invention.

By means of such a configuration, when the power switch 32, for example, is turned on in the first step, the switches 33 assigned switch numbers S31, S32, S33, and S44 are brought into a protruding state. In the display section 39, a character image "CASSETTE PLAYER" appears in the vicinity of the switch number S31; a character image "RADIO" appears in the vicinity of the switch number S32; a character image "TV" appears in the vicinity of the switch number S33; and a character image of "END" appears in the vicinity of the switch number S44. When any one of the switches 33 assigned the switch numbers S31, S32, S33, and S44 is pressed, the function assigned to the thus-pressed switch 33 is performed. In this case, in a case where the switch 33 assigned switch number S44 is pressed, the in-car switch controller is brought into an END state; i.e., power-off state.

In a case where in the second step the switch 33 assigned switch number S31, for example, is pressed, function "CASSETTE PLAYER" is enabled, thereby bringing the switches 33 assigned switch numbers S31, S33, S35, S37, S39, S43, and S44 into a protruding state. FIG. 13 is a perspective view showing the state of the panel switch 31 in this case. The display section 39 illustrated in FIG. 9 shows an example display of the images of the switches 33 in this case. If the switch 33 assigned switch number S31 is pressed successively, a playback operation is started. If the switch 33 assigned switch number S33 is pressed, playback is interrupted. If the switch 33 assigned switch number S39 is pressed during a playback operation, sound level gradually increases during the period of time in which the actuation of the switch 33 is continued. If the switch 33 assigned switch number S44 is actuated, the in-car switch controller is brought into a "RETURN TO SCREEN DISPLAY" mode, in which the switches 33 corresponding to address 31 and their corresponding images are displayed, thus enabling selection of a device.

In the present embodiment, the image data storage section ROM and the main control section MP are associated with devices to be controlled and their specified functions. There may also be prepared image data and programs associated with many types of devices and their functions, and the in-car switch controller may be arranged so as to be able to select appropriate ones from the image data and programs, in order to provide versatility to the in-car switch controller.

As has been described above, the driver can operate any one of the protruding switches 33 while viewing the display 39 and maintaining his driving posture. The driver can actuate a switch while ascertaining the switch by means of his sense of touch. Therefore, the present invention provides an in-car switch controller which does not impose any problem in driving a car and offers safety and excellent operability.

The present invention provides an in-car switch controller which enables a driver to control electronic devices provided in a car, the controller comprising:

a switch panel which can be placed in the vicinity of a driver's seat such that the driver can readily actuate the switch panel and which comprises a plurality of switches, an operation section of each of the switches being arranged so as to be selectively switched between a protruding state in which the operation section renders an operation effective and a depressed state in which the operation section renders an operation disabled;

a display section which can be provided in the front panel or in the vicinity thereof and displays images of the switches remaining in a protruding state and indication images for indicating the functions of the switches;

an image data storage section for storing image data used for producing the images of the switches and the indication images;

a display drive section for controlling the display section on the basis of the image data stored in the image data storage section;

a switch-status control section which performs a control operation for bringing the switches into a protruding state or a depressed state, on the basis of the image data stored in the image data storage section;

a switch layout control section which reads image data from the image data storage section in accordance with preset switch-status designation conditions or switch-status designation conditions which are set appropriately, to thereby impart the image data to the display drive section and the switch-status control section; and a control device which receives an operation signal from a switch and outputs a control signal for effecting the function assigned to the image of the switch displayed in the display section. By means of such a configuration, the driver can operate any one of the protruding switches while viewing the display and maintaining his driving posture. The driver can actuate a switch while ascertaining the switch by means of his sense of touch. Therefore, the present invention provides an in-car switch controller which does not impose any problem in driving a car and offers safety and excellent operability.

The present embodiment enables realization of the function of updating, to a specific set of image data, a set of indication image data consisting of images of protruding switches and indication images for indicating functions assigned to the respective switches. Thus, the present invention provides the function and yields the same advantageous result as that mentioned previously.

What is claimed is:

1. An in-car switch controller for a driver to control electronic devices provided in a car, comprising:

a switch panel placed in the vicinity of a driver's seat to be readily actuated by the driver, said switch panel including;
a plurality of main switches, and
sub-switches paired up with the corresponding main switches,
said sub-switch being arranged to designate and enable the function of said main switch;

a display section provided in a front panel or in the vicinity thereof which displays an image of said main switch paired up with the corresponding sub-switch and an advice image pertaining to the function of said main switch, when said sub-switch is actuated;

an image data storage section for storing image data used for producing the images of said main switches and the corresponding advice images thereto;

an image generation control section for generating the display image on the basis of the image data stored in said image data storage section;

a display drive section for activating said display section to display a display screen prepared by said image generation control section;

image data designation means for reading image data from said image data storage section in accordance with a specification instruction output from said sub-switch; and a control device which, upon receipt of an operation signal from said main switch enabled by said sub-switch, outputs a control signal for effecting the function assigned to the image of the switch displayed in said display section.

2. The in-car switch controller as defined in claim 1, wherein said main switches paired up with the corresponding sub-switches thereto are adjacent to each other or combined together, and when the sub-switch is actuated by means of touching or corresponding action, an operation section of the corresponding main switch is moved to activate said main switch.

3. An in-car switch controller for a driver to control electronic devices provided in a car, comprising:

a switch array placed in the vicinity of a driver's seat to be readily actuated by the driver, said switch array including a plurality of switches;

a camera disposed in the vicinity of the driver's seat which successively photographs the operating action of said switch array and the switching action of the driver;

an indication image data storage section which stores indication image data used for indicating functions assigned to said respective switches corresponding to the images photographed by said camera, in the areas surrounding said respective switches;

an image synthesis section for merging the image data pertaining to the photographed image and the indication image data stored in the indication image data storage section into a single image;

a display section placed on the front panel or in the vicinity thereof and displays the synthesized image; and a control section which receives an operation signal output from said switch and outputs a control signal for effecting the function assigned to the image of said switch displayed in said display section.

4. The in-car switch controller as defined in claim 3, wherein said image data storage section stores a plurality of sets of indication image data corresponding to an image of the switch array;

said switch has the function of designating a set of indication image data for each type of device to be controlled, so as to correspond to the indication of the switch's image; and said control section includes indication image data designation means which receives an operation signal from the switch to instruct said indication image data storage section to read image data in order to update the set of indication image data to the specific indication image set.

5. An in-car switch controller for a driver to control electronic devices provided in a car, comprising:

a switch panel placed in the vicinity of a driver's seat to be readily actuated by the driver;

said switch panel comprising:

a plurality of switches, and an operation section of each of said switches being arranged to be selectively switched between a protruding state in which said operation section renders an operation effective, and a depressed state in which said operation section renders an operation disabled;

a display section provided in a front panel or in the vicinity thereof to display images of said switches remaining in a protruding state and indication images for indicating the functions of said switches;

an image data storage section which stores image data used for producing the images of said switches and the indication images;

a display drive section which controls said display section on the basis of the image data stored in said image data storage section;

a switch-status control section which performs a control operation for bringing said switches into a protruding state or a depressed state, on the basis of the image data stored in said image data storage section;

a switch layout control section which reads image data from said image data storage section in accordance with preset switch-status designation conditions or switch-status designation conditions which are set appropriately to impart the image data to said display drive section and said switch-status control section; and a control device which receives an operation signal from a switch and outputs a control signal for effecting the function assigned to the image of said switch displayed in said display section.

6. The in-car switch controller as defined in claim 5, wherein said image data storage section stores a plurality of sets of image data consisting of images of said switches remaining in a protruding state and indication images for indicating the functions of said switches;

said switch has the function of designating a set of indication image data for each type of a device to be controlled, so as to correspond to the indication of said switch's image; and said control device includes switch layout designation means which receives an operation signal from said switch to specify an image data set, and instructs said image data storage section to read image data in order to update the specified image data set.

\* \* \* \* \*